(12) United States Patent
Eldracher

(10) Patent No.: US 7,848,512 B2
(45) Date of Patent: Dec. 7, 2010

(54) PERSONAL AUDIO DEVICE ACCESSORY

(76) Inventor: Kurt Eldracher, 17 Old Schoolhouse Rd., Andover, MA (US) 01810

( * ) Notice: Subject to any disclaimer, the term of this patent is extended or adjusted under 35 U.S.C. 154(b) by 1096 days.

(21) Appl. No.: 11/541,202

(22) Filed: Sep. 29, 2006

(65) Prior Publication Data

US 2007/0220718 A1 Sep. 27, 2007

Related U.S. Application Data

(60) Provisional application No. 60/786,089, filed on Mar. 27, 2006.

(51) Int. Cl.
*H04M 1/00* (2006.01)
*H04M 9/00* (2006.01)

(52) U.S. Cl. .................. 379/450; 379/455; 381/374

(58) Field of Classification Search .............. 379/441, 379/446, 447, 449, 450, 454, 455; 455/575.1, 455/575.2; 381/374, 381, 385; 224/222, 224/676; 2/267
See application file for complete search history.

(56) References Cited

U.S. PATENT DOCUMENTS

| | | | |
|---|---|---|---|
| 1,360,988 A | 11/1920 | Potstada | |
| 3,928,734 A | 12/1975 | Noury, Jr. | |
| 3,983,483 A | 9/1976 | Pando | |
| 4,070,553 A | 1/1978 | Hass | |
| 4,136,805 A | 1/1979 | Storms | |
| 4,509,667 A | 4/1985 | Meldrum | |
| 4,913,326 A | 4/1990 | Echelson | |
| 4,993,065 A | 2/1991 | Chiou | |
| 5,163,093 A | 11/1992 | Frielingsdorf et al. | |
| 5,212,734 A | 5/1993 | Tsao | |
| 5,244,135 A | 9/1993 | Nelson | |
| 5,265,624 A | 11/1993 | Bowman | |
| 5,268,826 A | 12/1993 | Greene | |
| 5,295,949 A | 3/1994 | Hathaway | |
| 5,366,072 A | 11/1994 | Goldenberg | |
| 5,410,762 A | 5/1995 | Maskovich | |
| 5,457,745 A * | 10/1995 | Wang | 379/454 |
| 5,457,751 A | 10/1995 | Such | |
| 5,488,354 A | 1/1996 | Bobby | |
| 5,507,793 A | 4/1996 | Hodges | |
| 5,568,127 A | 10/1996 | Bang | |
| 5,642,426 A | 6/1997 | Neuman et al. | |
| 5,701,356 A | 12/1997 | Stanford et al. | |
| 5,746,365 A * | 5/1998 | Scott | 224/676 |
| D395,653 S | 6/1998 | Read et al. | |
| 5,956,630 A | 9/1999 | Mackey | |
| 6,091,832 A | 7/2000 | Shurman et al. | |

(Continued)

OTHER PUBLICATIONS iSound Cap. i Sound Cap, Inc., 2006 (retrieved on Sep. 29, 2006) Retrieved from the Internet <url:http://www.isoundcap.com/Merchant2/merchant.mvc?Screen=CTGY&Store_Code=I&Catego.

*Primary Examiner*—Tuan D Nguyen
(74) *Attorney, Agent, or Firm*—Holland & Knight LLP; Brian J. Colandreo, Esq.; V. Raman Bharatula, Esq.

(57) ABSTRACT

A personal audio device accessory includes a collar having a semi-circular back portion and two side members extending from the semi-circular back portion. The side members form an opening to enable the collar to be placed around a user's neck. An adjustable mounting clip is coupled to the semi-circular back portion to removably retain a personal audio device behind the user's neck.

22 Claims, 12 Drawing Sheets

U.S. PATENT DOCUMENTS

| | | | |
|---|---|---|---|
| 6,178,251 | B1 | 1/2001 | Luchs et al. |
| 6,264,029 | B1 | 7/2001 | Motson |
| 6,533,150 | B1 | 3/2003 | Margo et al. |
| 6,539,588 | B1 | 4/2003 | Brosofsky et al. |
| 6,567,651 | B2 * | 5/2003 | Whitley ............... 455/90.1 |
| 6,594,370 | B1 | 7/2003 | Anderson |
| 6,603,863 | B1 | 8/2003 | Nagayoshi |
| 6,611,419 | B1 | 8/2003 | Chakravorty |
| 6,721,579 | B2 | 4/2004 | Lin |
| 6,728,556 | B1 * | 4/2004 | Whitley ............... 455/575.1 |
| 6,763,119 | B2 | 7/2004 | Lee |
| 6,798,391 | B2 | 9/2004 | Peterson, III |
| 7,017,243 | B2 | 3/2006 | Carnevali |
| 7,059,503 | B2 | 6/2006 | Anderson |
| D525,614 | S | 7/2006 | Lee |
| 2002/0043545 | A1 | 4/2002 | Tang |
| 2002/0065115 | A1 | 5/2002 | Lindholm |
| 2002/0090099 | A1 | 7/2002 | Hwang |
| 2003/0040285 | A1 * | 2/2003 | Whitley ............... 455/90 |
| 2003/0233736 | A1 | 12/2003 | Faerber et al. |
| 2004/0056061 | A1 | 3/2004 | Yang |
| 2004/0134945 | A1 | 7/2004 | Kincaid et al. |
| 2004/0232179 | A1 | 11/2004 | Chauhan |
| 2005/0078274 | A1 | 4/2005 | Howell et al. |
| 2006/0052064 | A1 | 3/2006 | Goradesky |
| 2006/0076375 | A1 | 4/2006 | Bhakta |
| 2006/0093178 | A1 | 5/2006 | Chen |
| 2006/0105821 | A1 | 5/2006 | Goradeskyt et al. |
| 2006/0153409 | A1 | 7/2006 | Yeb |
| 2006/0158608 | A1 | 7/2006 | Lin |
| 2006/0168710 | A1 | 8/2006 | Vito et al. |
| 2006/0177086 | A1 | 8/2006 | Rye et al. |
| 2006/0186150 | A1 | 8/2006 | Willows et al. |

* cited by examiner

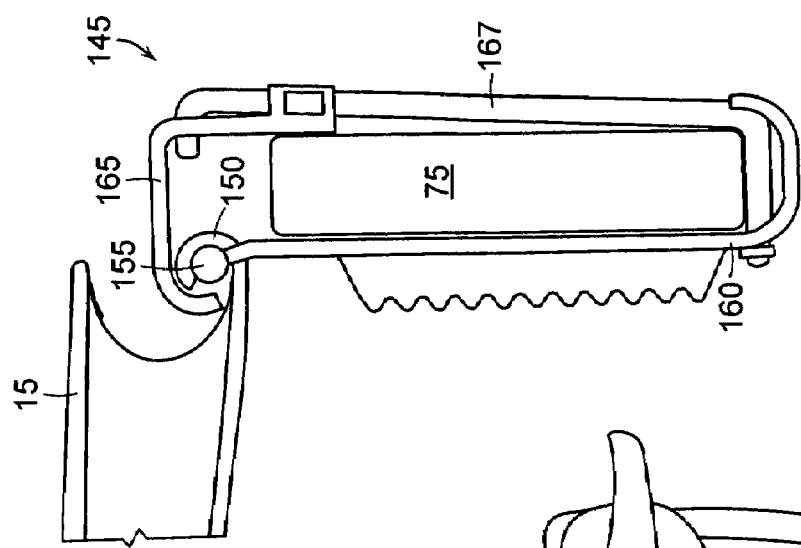
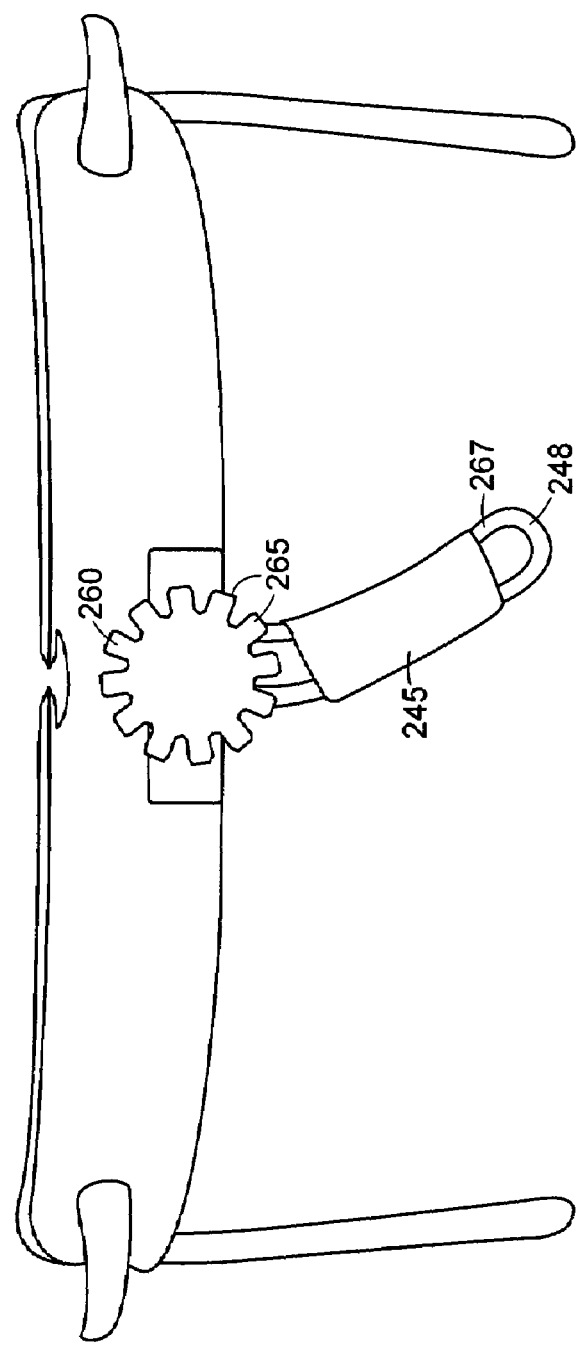

PERSONAL AUDIO DEVICE ACCESSORY

CROSS-REFERENCE TO RELATED APPLICATIONS

This application claims the benefit under 35 U.S.C. 119(e) of U.S. Provisional Application Ser. No. 60/786,089 filed Mar. 27, 2006, the entire contents of which is hereby incorporated by reference.

FIELD OF INVENTION

The present invention relates to audio devices and more specifically to personal audio device accessory.

BACKGROUND

Many people listen to personal audio devices, such as MPEG-1 Audio Layer-3 (MP3) players, while working or exercising. Personal audio devices typically include a player and headphones or "ear buds" that the user wears over or in her ears which connect to the player through long wires. While listening to the personal audio device, a user may hold the player in her hand or somehow attach the player to her body, for example, by using an arm band or lanyard around her neck. These methods can have drawbacks.

For example, holding the player in a hand makes that hand unusable for other activities that may be necessary or desired for the type of work or exercise being performed, such as grasping weights or handlebars on a bicycle. Further, it is possible to drop the player during physical activity, such as running. A lanyard may be undesirable during physical activity because it may cause the player to bounce, causing discomfort to the user or damage to the player. Also, a lanyard may be a strangulation hazard if the lanyard becomes entangled with an external object while working or exercising. Further, an armband does not allow for easy access to the player, and, because it is placed on one side of the user's body, may cause an undesirable anatomical imbalance.

Further, since the personal audio device is typically held in the user's hand or clipped to the user remote from the user's ears, the long wires from the player to the headphones tend to get in the way of working or exercising. Because the long wires are dangling lose around the user, the wires may become entangled with the user, someone around the user, or something around the user, and cause the headphones or ear buds to be ripped from the user's ears. This may cause injury to the user's ears or damage to the headphones or wires. Even if the user were to clip the wire to her clothing, for example, to a shirt, between the player and her ears, sudden head movement may cause the headphones or ear buds to be ripped from the user's ears.

Also, when a player is attached to a user remotely from the user's ears, the long wires tend to rub against the user, enabling the transmission of unwanted noise through the wires to the user's headphones or ear buds. This unwanted transmission of noise may also occur even if the wires are clipped to the user's clothing at various points.

Further still, a player hanging from a lanyard or in an armband is typically visible to others around the user, particularly in warmer weather when the user is not wearing layers of clothing. Many MP3 players are taken from users while the user is wearing the player in a visible location. For example, MP3 players have been ripped from a user's neck while hanging from a lanyard around a user's neck.

Also, wearing a personal audio device, such as an MP3 player, with headphones or ear buds may cause isolationism (e.g., the user not being able to hear cars around her). While arm bands or lanyards may include safety devices, such as reflective tape, that safety device will be on the front of the user (in the case of a lanyard) or on one side of the user (in the case of an armband). However, the dangers of isolationism tend to come towards the user's back.

SUMMARY

The present invention provides an accessory that provides a secure mount for the audio device behind the user's neck and manages the long wires to the user's ears during use.

In general, in one aspect, the invention features a personal audio device accessory including a U-shaped collar having a semi-circular back portion, two side members extending from the semi-circular back portion and an opening defined by the ends of the two side members. An adjustable mounting clip is coupled to the semi-circular back portion to removably hold a personal audio device.

In embodiments, the personal audio device accessory also includes hook projections extending from the collar to retain wires from the personal audio device.

In certain embodiments, the adjustable mounting clip includes a base clip rotatably coupled to the semi-circular back portion and a movable clip movably coupled to the base clip. In other embodiments, the adjustable mounting clip comprises a base clip rotatably coupled to the semi-circular back portion and a top clip connected to the base clip by an elastomeric band. The top clip is removably connectable to the base clip to retain the audio device. In still other embodiments, the adjustable mounting clip comprises a base clip rotatably coupled to the semi-circular back portion and an elastomeric band attached to the base clip at a first end and removably connectable to the base clip at a second end.

In further embodiments, the adjustable mounting clip comprises an elastomeric loop including a button spool coupled to the semi-circular back portion. The elastomeric loop portion may be stretched around a personal audio device and hooked to itself by the button spool. In certain embodiments, the button spool includes teeth to retain wires from the personal audio device.

In embodiments, the adjustable mounting clip comprises pointers to enable tactile navigation of the personal audio device.

In embodiments, the personal audio device may be a digital music player, an MP3 player, a radio, a cellular telephone, a personal digital assistant, and a tape player.

In certain embodiments, the two side members are generally parallel to each other and the distal ends of the two side members are less than parallel to each other to form an inwardly projecting angle.

In embodiments, the collar also includes hook projections, a wire retaining recess and wire retaining clips to manage and maintain the wires from the personal audio device retained in the adjustable mounting clip. In other embodiments, the semi-circular back portion also includes a concave recess to maintain the wires from a personal audio device retained in the adjustable mounting clip.

In certain embodiments, the semi-circular back portion and the side members are a separate pieces movably coupled together by hinges. In other embodiments, the semi-circular back portion and the side members are a separate pieces movably coupled together by adjustable connections.

In embodiments, the collar further include recesses that enable the side members to flex. In further embodiments, the collar may be made of plastic, rubber, polycarbonate, or metal. In other embodiments, at least portions of the collar are overmolded with a thermoplastic elastomer. In still further embodiments, the personal audio device accessory also includes safety features. In certain embodiments, the safety features may be iridescent plastic, reflective tape, a reflector, or light emitting diodes.

In general, in another aspect, the invention features a personal audio device accessory including a collar having a semi-circular back portion with an inner surface and an outer surface, and a concave recess on the outer surface. Two side members extending from the semi-circular back portion, each having an inner surface, an outer surface and a distal end. The inner surface of the semi-circular back portion and inner surface of the side members form a continuous inner surface of the collar, and the outer surface of the semi-circular back portion and the outer surface of the side members form a continuous outer surface of the collar. An opening is defined by the distal ends of the two side members. Two hook projections extend from the outer surface of the collar. In use, the concave recess and two hook projections enable the retention of wires from a personal audio device. An adjustable mounting clip, coupled to the collar, to removably retain the personal audio device includes a base clip rotatably coupled to the semi-circular back portion. A movable clip is movably coupled to the base clip to move into and out of engagement with the personal audio device. A locking mechanism prevents unwanted movement of the movable clip.

In embodiments, the personal audio device accessory also includes a thermoplastic elastomer disposed on at least a portion of the inner surface of the collar.

In certain embodiments, the adjustable mounting clip also includes pointers to enable tactile navigation of the personal audio device. In other embodiments, the personal audio device accessory also includes safety features. In certain embodiments, the safety features may be iridescent plastic, reflective tape, a reflector, or light emitting diodes.

The invention can be implemented to realize one or more of the following advantages. The audio device accessory provides a collar for secure mounting behind a user's neck without limiting user mobility. An adjustable mounting clip enables many different audio devices to be used with the audio device accessory. Also, the audio device accessory enables using an audio device accessory that helps prevent damage to the player, wires and headphones. The audio device accessory also maintains the player in a single, stable position such that it does not interfere with working or exercising. This stable position further enables better anatomical balance because the player is centrally located and maintained along the center of the user's body.

Further still, the audio device accessory manages the wires to the headphones to eliminate entanglement of the wires with the user, exercise equipment, work equipment or machines that can occur during physical activities. This provides safety benefits by maintaining the wires and player in a manner that alleviates strangulation hazards. Even if the wires were to become entangled, an open end of the collar enables the collar to pull free from the user's neck. This wire management also minimizes the amount of wire exposed to potential rubbing against the user, thereby reducing or eliminating unwanted noise transmission through the wires.

Also, the audio device accessory enables use whether worn with minimal clothing, such as gym or summer clothes, or with heavy, layered clothing. Further, the audio device accessory enables the user to hide the audio device beneath a shirt, even if minimal clothing is being worn. For example, the audio device may be tucked under a T-shirt in the summer.

Further, the audio device accessory may enable tactile navigation of the audio device while in use, so that the user does not have to physically see the player controls or stop any activity to look at the player. For example, the adjustable mounting clip may include pointers that enable a user to locate and navigate controls on the player by feeling for the pointers.

Also, the audio device accessory may include safety features, such as reflective portions or flashing lights, that alert others approaching the user from behind to the user's presence.

Other features and advantages of the invention are apparent from the following description, and from the claims.

BRIEF DESCRIPTION OF THE DRAWINGS

FIG. 10 is a side view of the audio device accessory of FIG. 9.
FIG. 11 is a back view of an audio device accessory.

Like reference numbers and designations in the various drawings indicate like elements.

DETAILED DESCRIPTION

Figure 1:
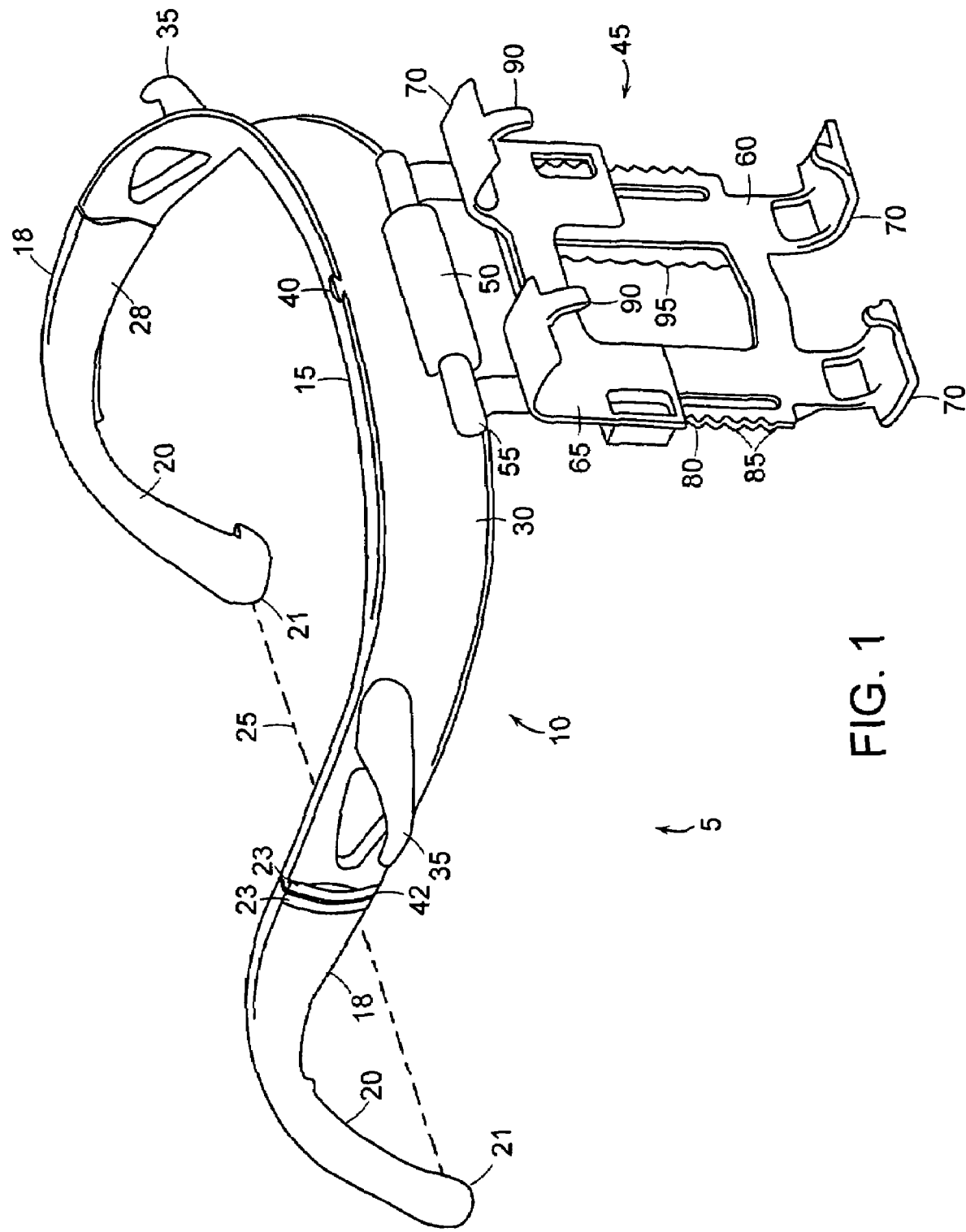
FIG. 1 is a perspective view of an audio device accessory.
Figure 2:
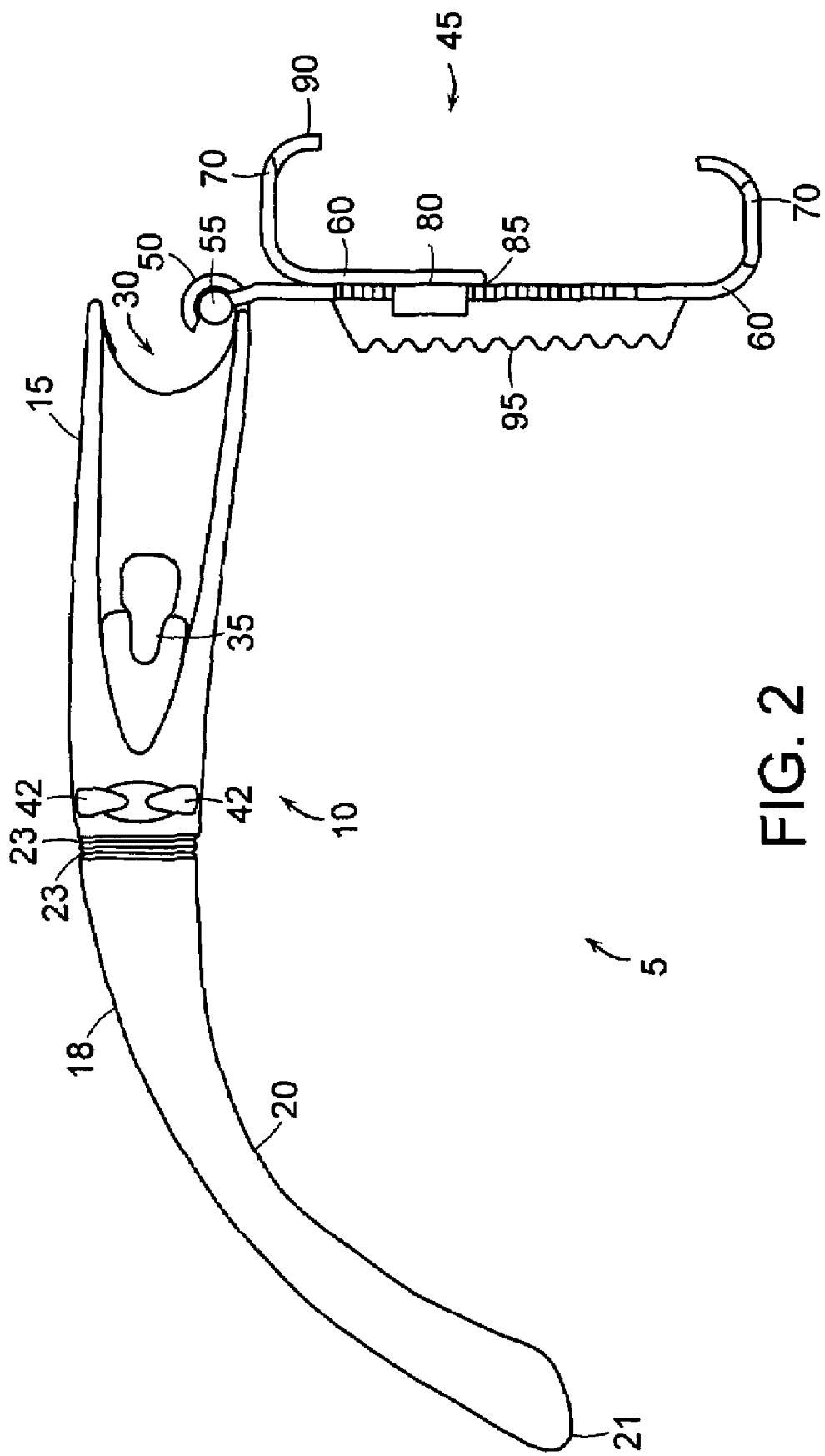
FIG. 2 is a side view of the audio device accessory of FIG. 1.
Figure 3:
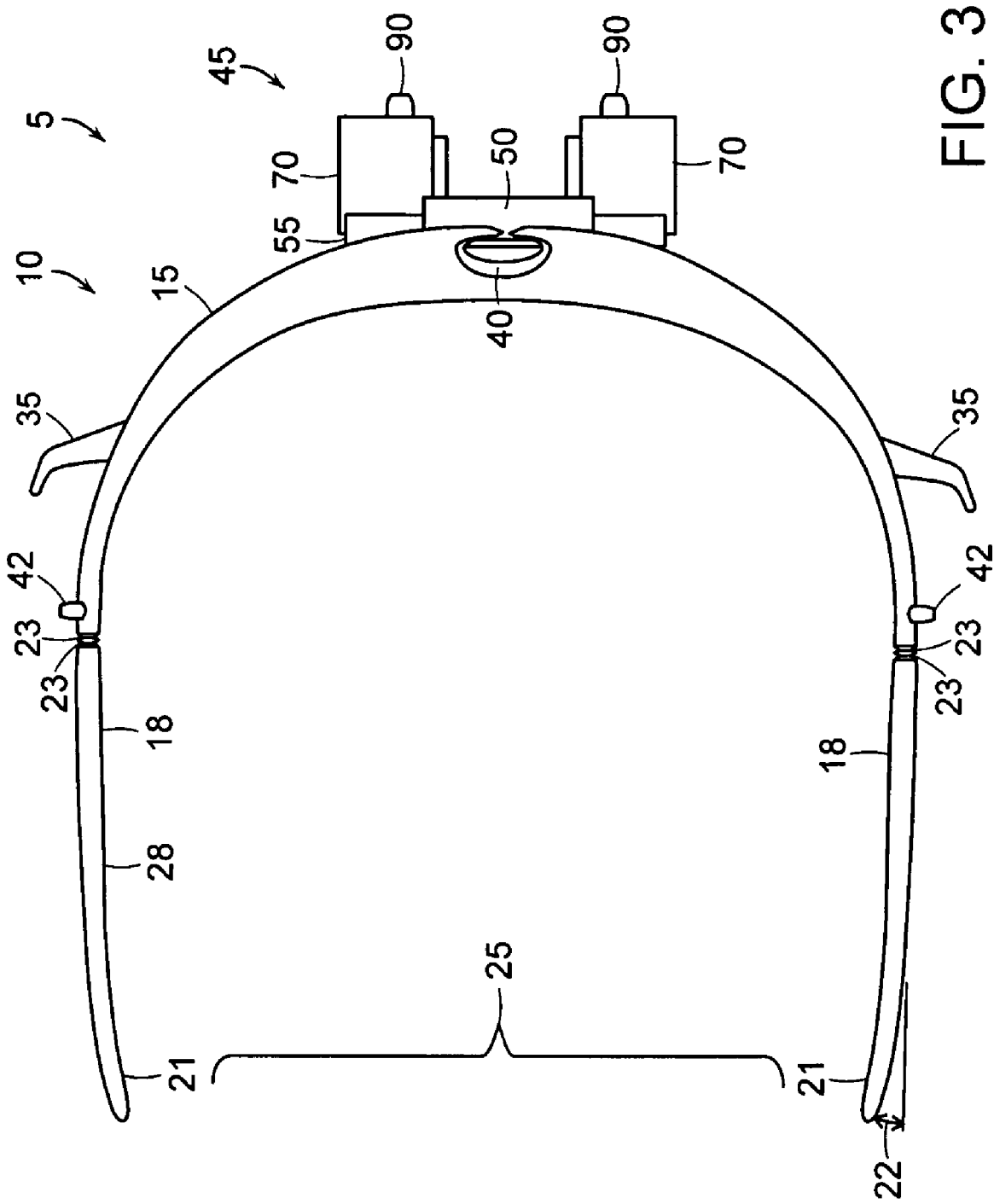
FIG. 3 is a top view of the audio device accessory of FIG. 1.
Figure 4:
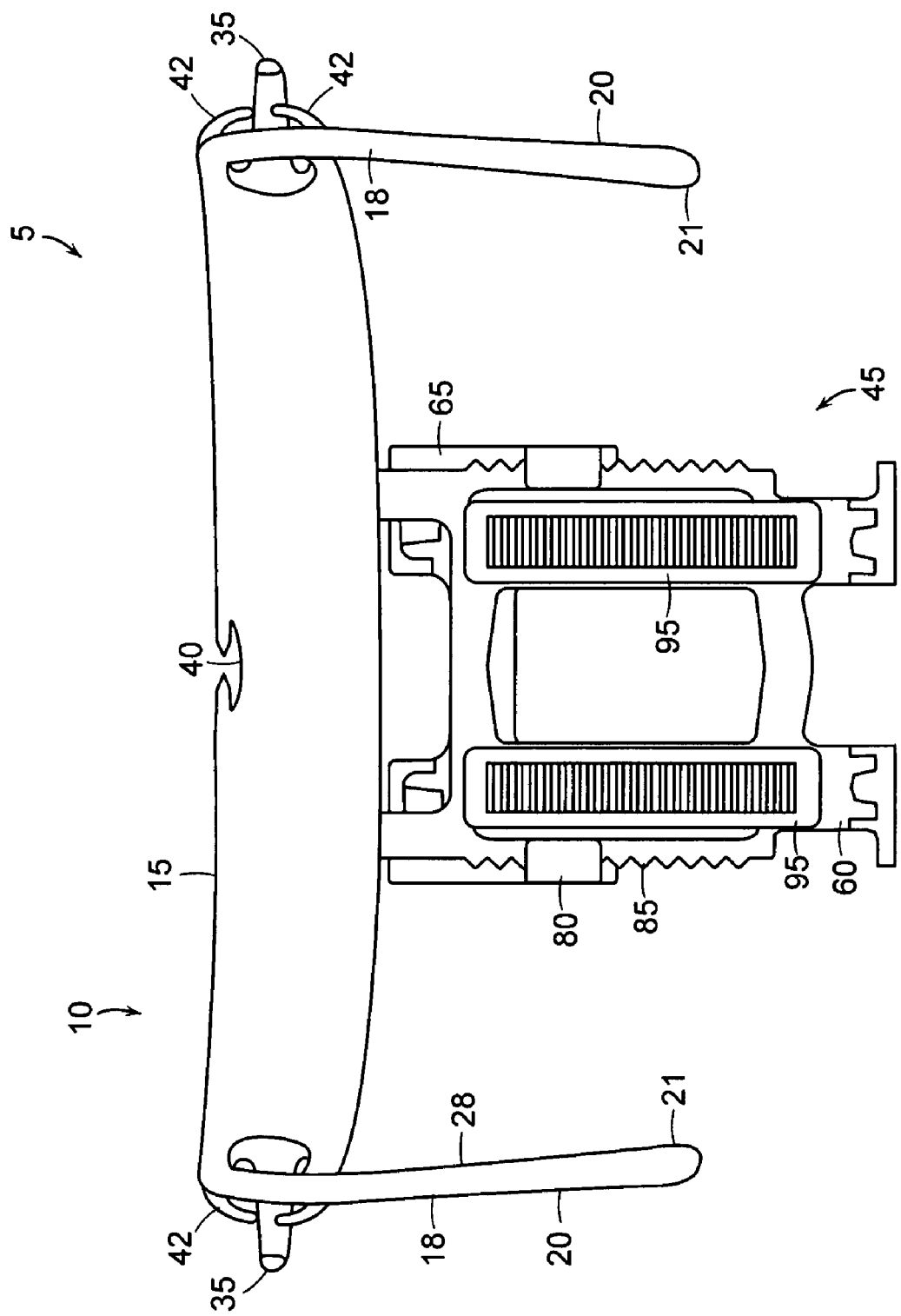
FIG. 4 is a front view of the audio device accessory of FIG. 1.
Figure 5:
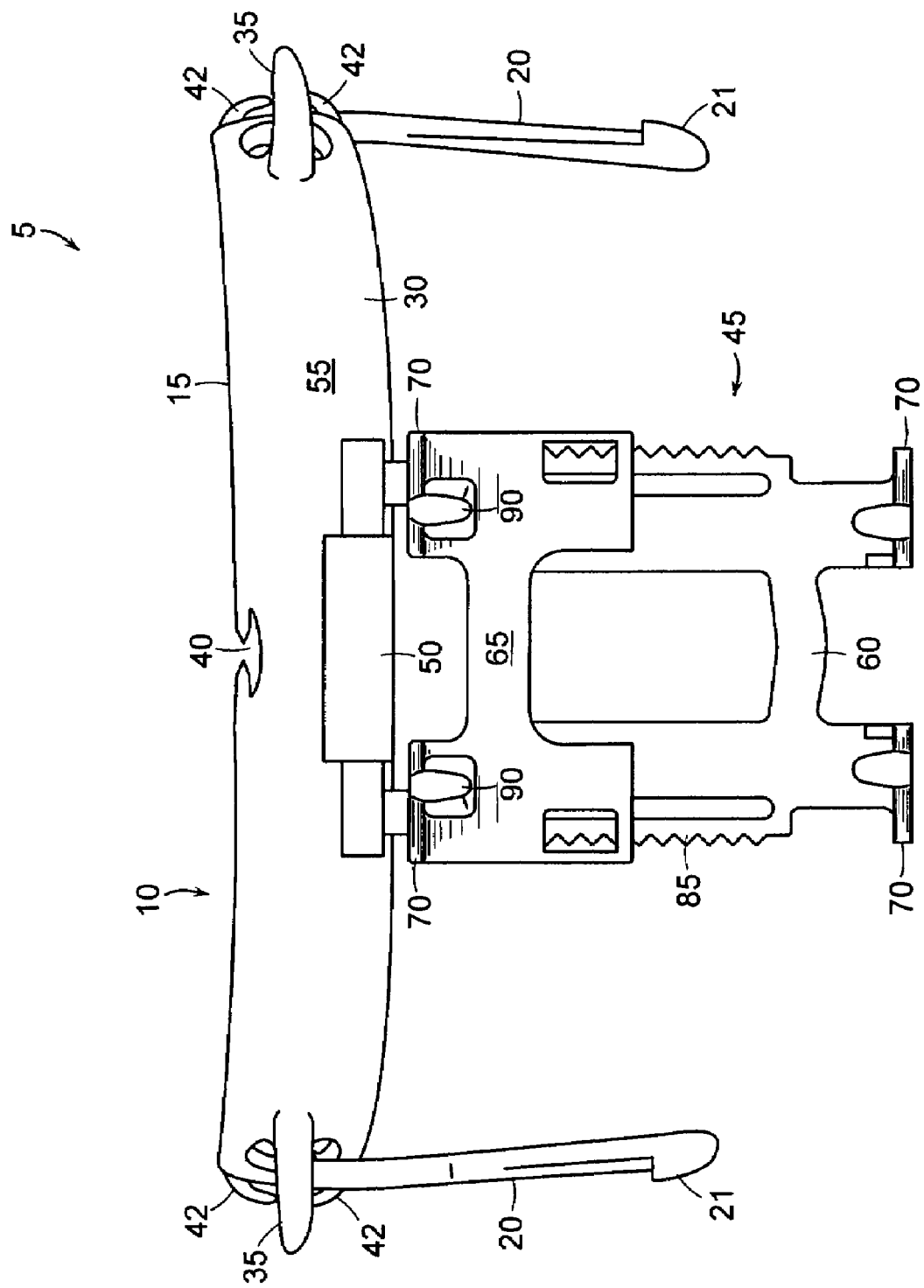
FIG. 5 is a back view of the audio device accessory of FIG. 1.

As shown in FIGS. 1-5, the audio device accessory 5 includes a flexible collar 10, which is generally U-shaped with a semi-circular back portion 15 and two side members 18 that may be shaped as downward projections 20 extending from the semi-circular back portion 15. The two downward projections 20 are generally parallel to each other and form an opening 25 in the flexible collar 10. Each downward projection 20 may form an inwardly projecting angle 22 towards it distal end 21, such that the distal ends 21 are less than parallel to each other. This angle is preferably between 5 and 20 degrees, and more preferably approximately 15 degrees.

The flexible collar 10 may be made of a plastic material, such as polycarbonate. The flexible collar may also be made of rubber, metal, or any combination thereof. Further, the flexible collar may be made of a material, such as a plastic, that includes iridescent properties to alert people approaching from a user's back of the user's presence. To provide more flexibility, the flexible collar 10 may include a plurality of recesses 23 that enable greater flexibility in the plastic material. Further, the interior surface 28 of the flexible collar 10 may be overmolded with a softer material, such as thermoplastic elastomers, to provide comfort and to prevent or limit slipping. This overmolded thermoplastic elastomer may be in the form of ribs, pins, or flat pads, and may be in select areas of the interior surface 28 or cover the entire interior surface 28. If the overmolded thermoplastic elastomer is formed as ribs or pins, it may be shaped to provide an air gap between the flexible collar 10 and the user when worn, as described below, to provide some cooling effects.

The semi-circular back portion 15 includes a concave recess 30 and two hook projections 35 to maintain wires from a personal audio device. The semi-circular back portion 15 may also include a wire retaining recess 40 that operates in conjunction with the concave recess 30 and two hook projections 35. Further, the flexible collar 10 may include wire retaining clips 42, which help maintain and manage the wires.

An adjustable mounting clip 45 is rotatably coupled to the semi-circular back portion 15 of the flexible collar 10 by a cylindrical clip 50, which is attached to the semi-circular back portion 15. The adjustable mounting clip 45 includes a cylindrical bar 55 that engages cylindrical clip 50 such that the cylindrical bar 55 may rotate within the cylindrical clip 50. Preferably, the cylindrical bar 55 is sized and/or shaped to engage the cylindrical clip 50 as a cylindrical pressure joint to resist unwanted swinging motion, but still enable desired rotation to properly position the adjustable mounting clip 45.

Figure 6:
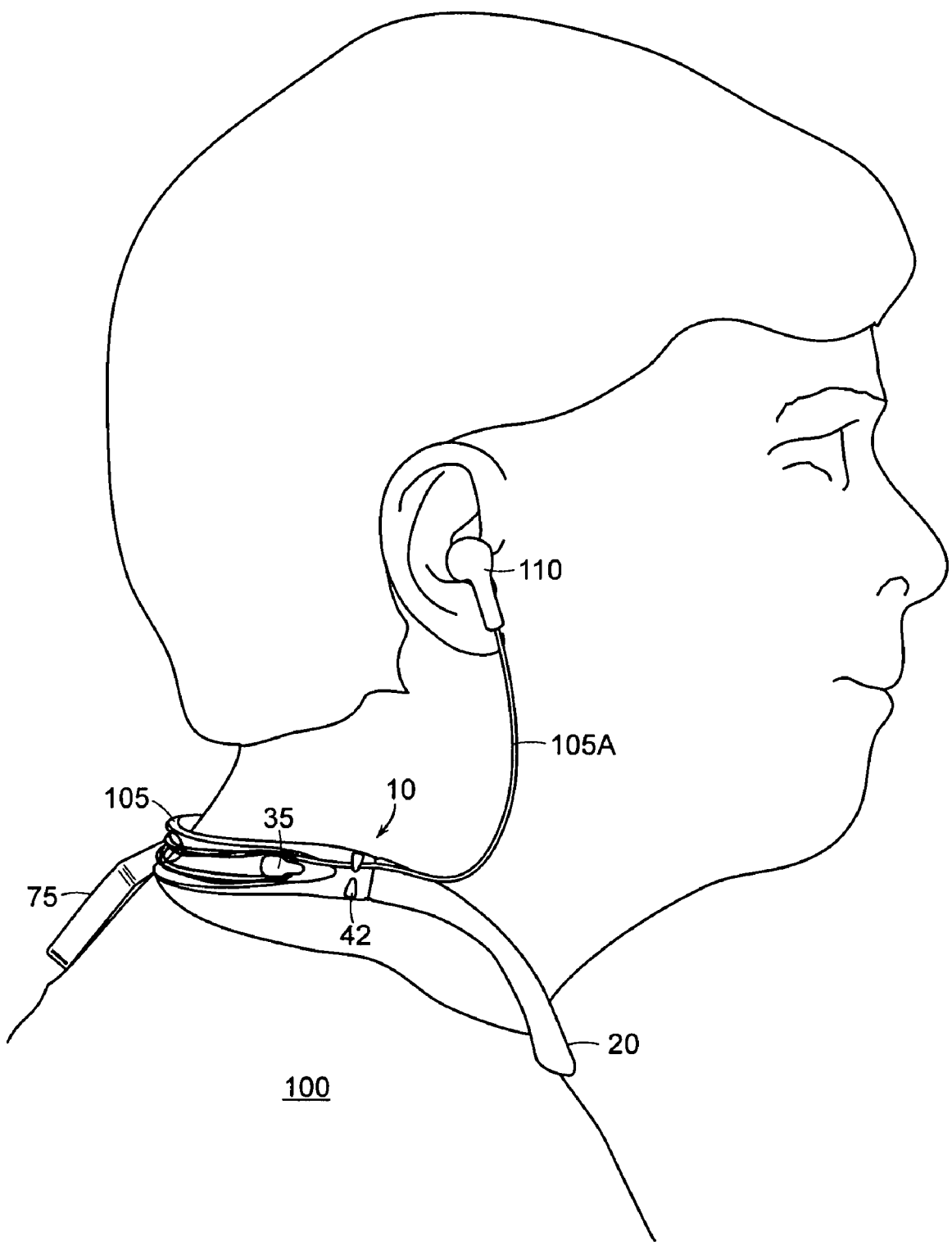
FIG. 6 is a side view of the audio device accessory of FIG. 1 with a personal audio device attached.
Figure 7:
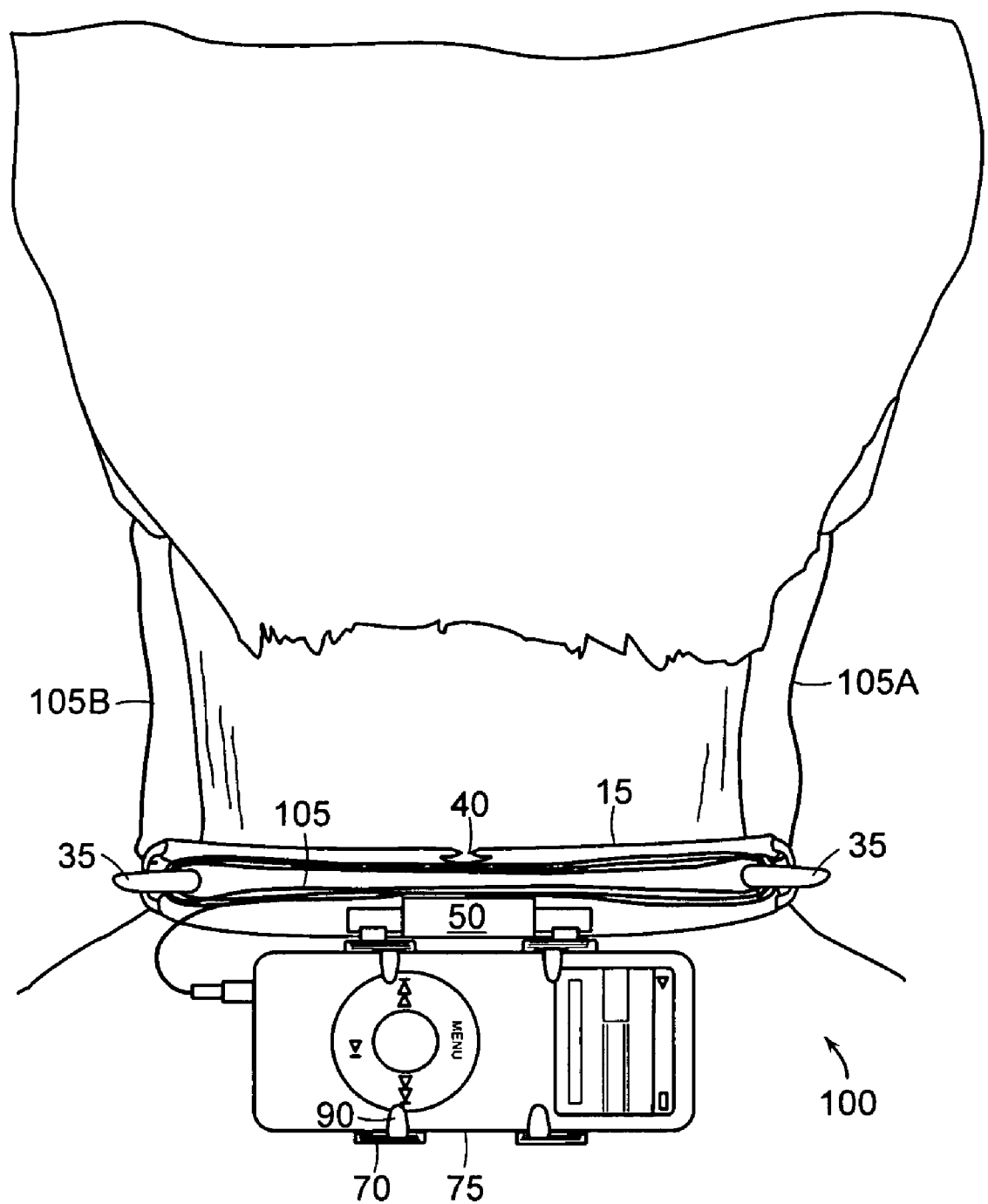
FIG. 7 is a back view of the audio device accessory of FIG. 6.

The adjustable mounting clip 45 also includes a base clip 60 attached to the cylindrical bar 55 and a movable clip 65 that slides up and down on the base clip 60. The base clip 60 and movable clip 65 include fingers 70 that project outwardly to capture and hold a player 75 (FIGS. 6 and 7). In use, the movable clip 65 slides down the base clip 60 to engage the player 75. Preferably, the fingers 70 are flexible to generate pressure on the player 75 to securely maintain the player 75 within the adjustable mounting clip 45. The base clip 60 and movable clip 65 further include a locking device 80 to maintain the movable clip 65 in secure engagement with the player 75. The locking device 80 may be, for example, ratcheting teeth 85 to prevent unwanted movement of the movable clip 65, but still enable movement of the movable clip 65 when a user desires to remove the player 75 from the flexible collar 10.

The base clip 60 may also include thermoplastic elastomer pins 95 on a surface that is adjacent to the user when worn. These thermoplastic elastomer pins 95 provide comfort and prevent or limit slipping of the flexible collar 10. The adjustable mounting clip 45 may include pointers 90 that enable tactile navigation of the player 75 while being worn around a user's neck without the need to remove the flexible collar 10 to visually see the player 75. The pointers 90 may, for example, define the top and bottom of a navigation wheel on an Apple® iPod® MP3 player.

Figure 8:
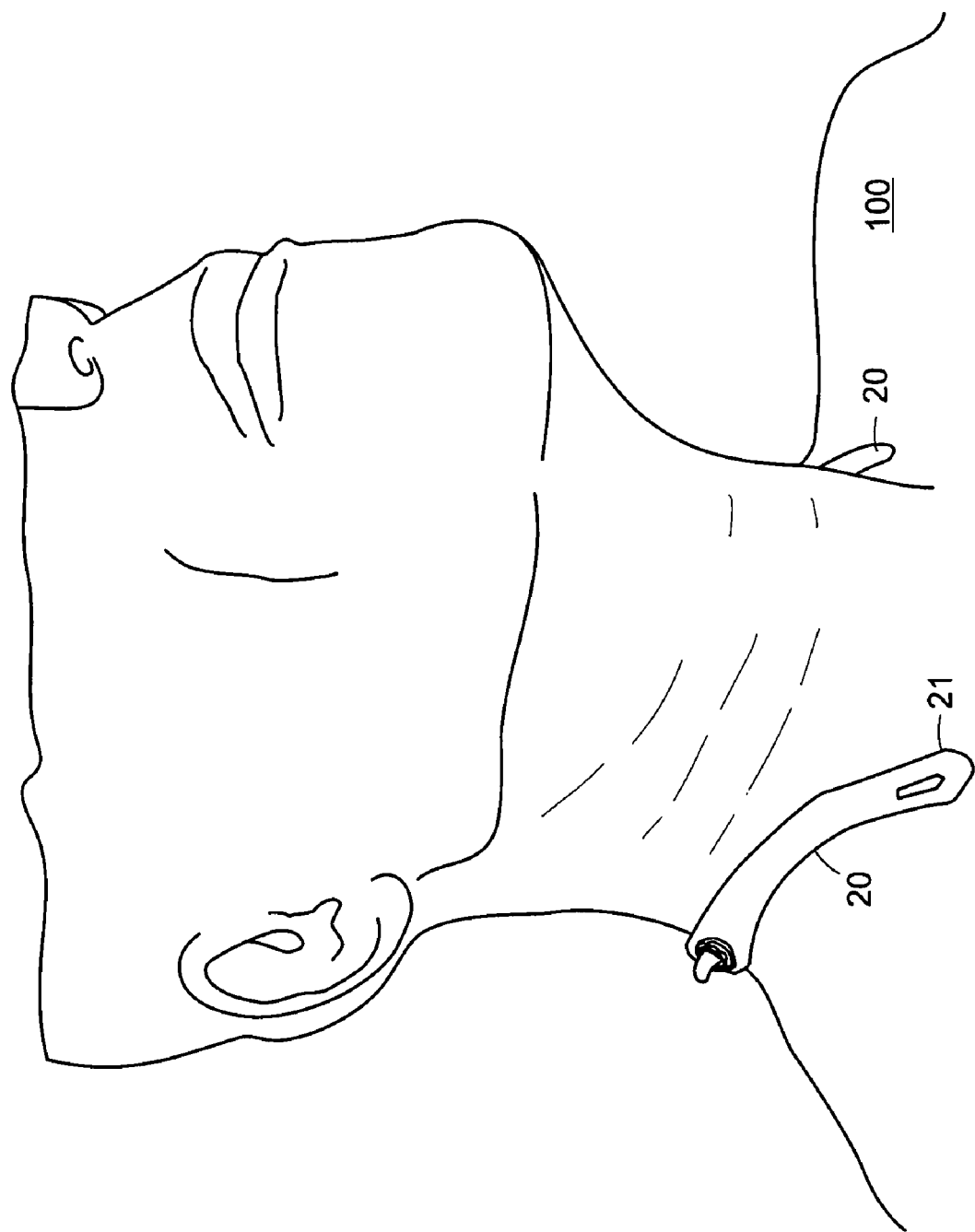
FIG. 8 is a front view of the audio device accessory of FIG. 6.

Referring to FIGS. 6-8, the player 75 is secured in the adjustable mounting clip 45 and the wires 105 are wrapped around the hook projections 35. The concave recess 30 helps maintain the wires 105 within the flexible collar 10. The hook projections 35 are spaced apart such that the wires 105 are maintained with minimal bends, thereby reducing stress on the wires 105. The wires 105 may be placed in the wire retaining recess 40 and split to go to each ear. This helps stably maintain the wires 105 in the flexible collar 10. Each individual wire 105A, 105B is fed through the wire retaining clips 42 on either side of the flexible collar 10. The wire retaining clips 42 position the individual wires 105A, 105B in close proximity to the user's ears so that the user 100 can place the ear buds 110 into his ears. This wire management system of hook projections 35, wire retaining recess 40 and wire retaining clips 42 alleviate a common problem of headphones or ear buds being unintentionally pulled from the user's ears, either from unexpected head movement or entanglement of the wires 105 with some external object.

A user 100 places the flexible collar 10 around his neck with the opening 25 at the front of his neck. The downward projections 20 of the flexible collar 10 lie along the side of the user's neck and generally conform to the user's shoulders. The shape and slight inward angle 22 of the downward projections 20, in conjunction with the materials chosen, help maintain the flexible collar 10 on the user's neck by light, inward pressure. The adjustable mounting clip 45 is rotated within the cylindrical clip 50 to rest generally on the back of the user's neck or between the user's shoulders. The three points of contact provided by the two downward projections 20 and the adjustable mounting clip 45 enable a tripod effect that helps maintain the flexible collar 10 in position, and helps resist or limit sliding down the user's back. The thermoplastic elastomer pins 95 on the adjustable mounting clip 45 and the interior surface 28 of the flexible collar 10 also help maintain the flexible collar 10 in position and help prevent or limit the flexible collar 10 from sliding down the user's back.

Figure 9:
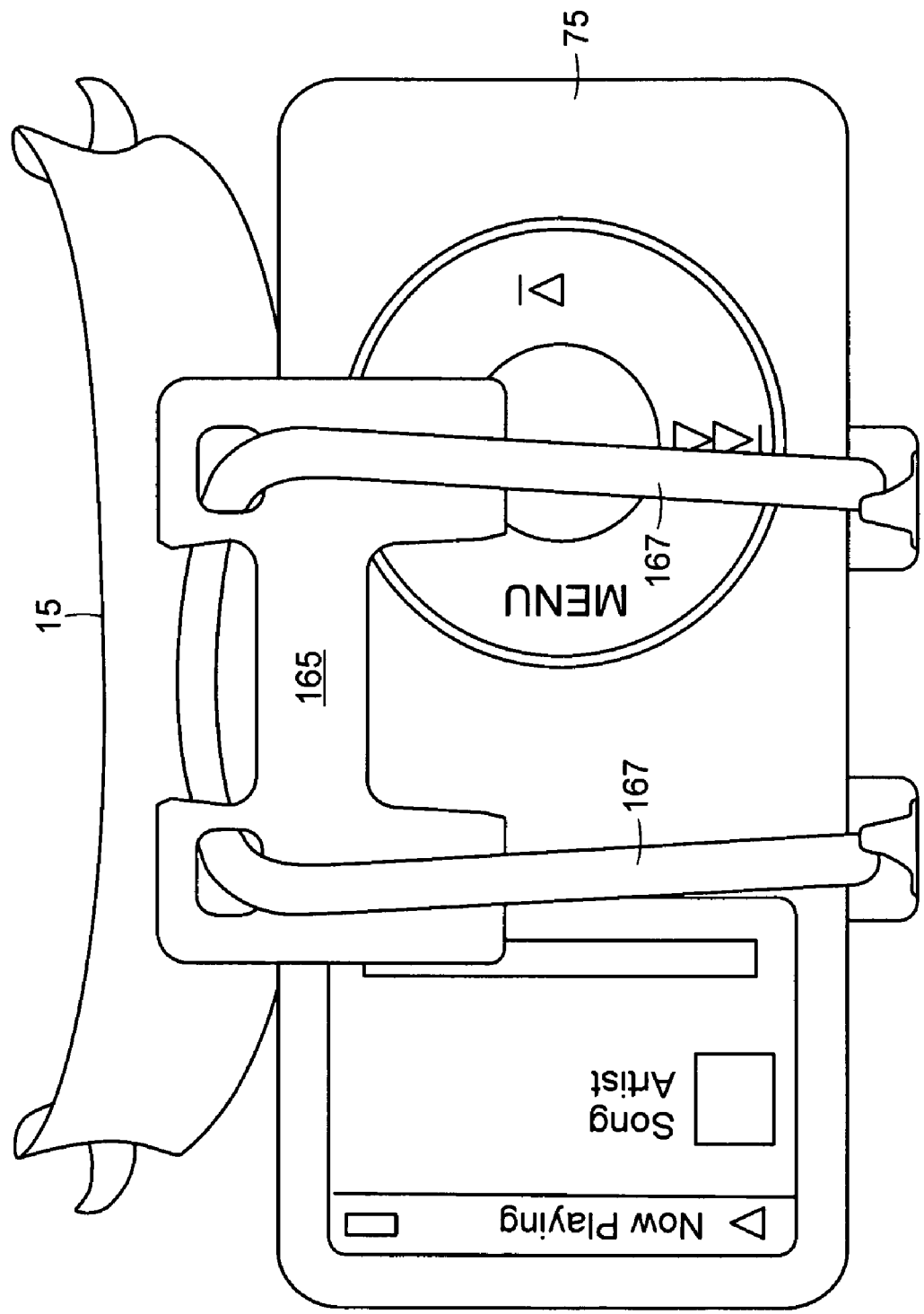
FIG. 9 is a back view of an audio device accessory.
Figure 13:
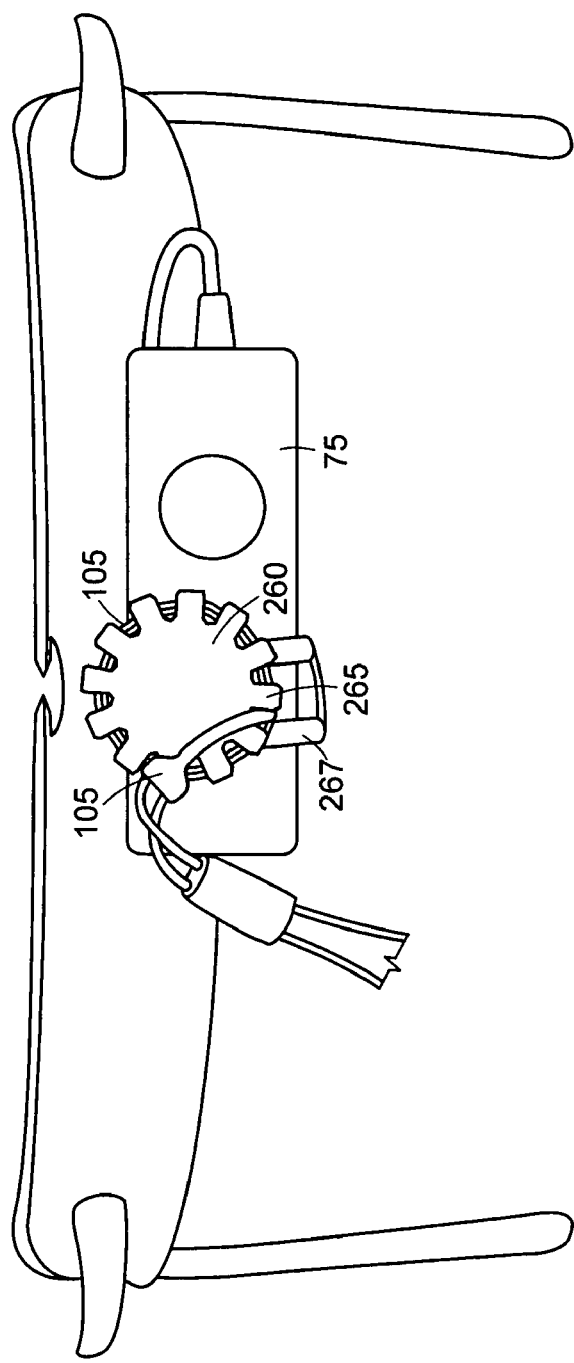
FIG. 13 is a back of the audio device accessory of FIG. 11 with a personal audio device attached.
Figure 12:
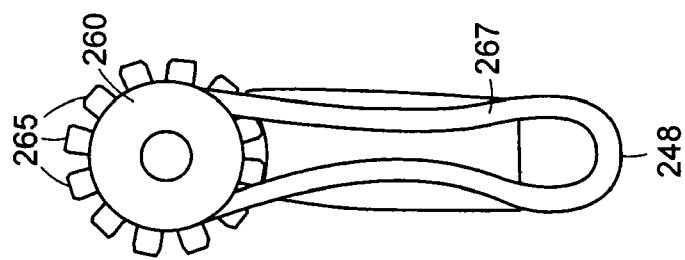
FIG. 12 is a front view of the audio device accessory of FIG. 11.
Figure 14:
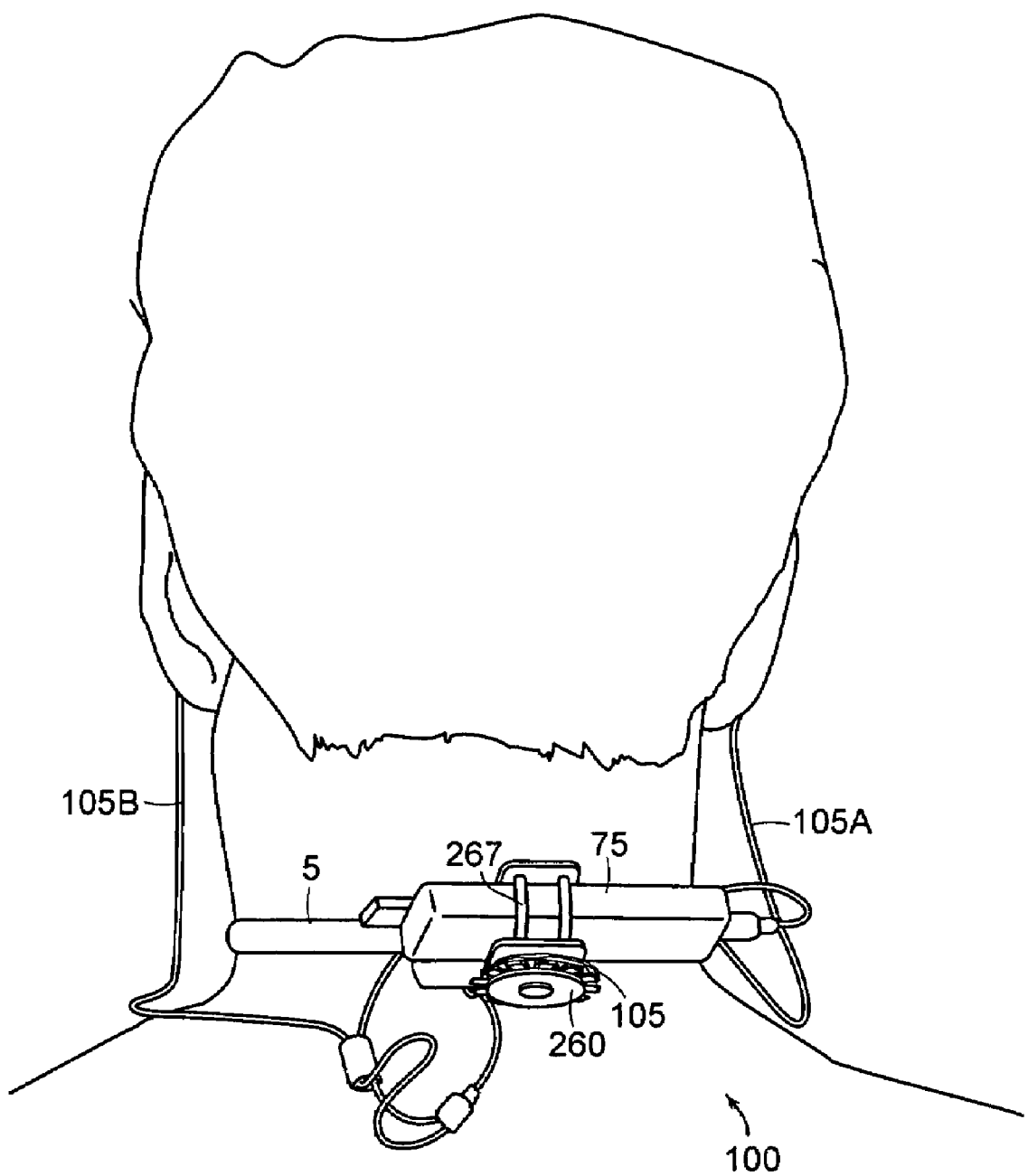
FIG. 14 is a back view of the audio device accessory of FIG. 11 with a personal audio device attached.

Referring now to FIGS. 9 and 10, another example of an adjustable mounting clip 145 is shown. The adjustable mounting clip 145 includes a cylindrical bar 155 that engages a cylindrical clip 150 that is attached to the flexible collar 10. The cylindrical bar 155 is preferably sized and/or shaped to engage the cylindrical clip 150 as a cylindrical pressure joint to resist or limit unwanted swinging motion, but still enable desired rotation to properly position the adjustable mounting clip 145.

The adjustable mounting clip 145 includes a base clip 160 attached to the cylindrical bar 155 and a top clip 165. An adjustable elastomeric band 167 is looped through the top clip 165 and connected to the base clip 160. In use, a player 175 is placed in the base clip 160 and the top clip 165 and the elastomeric band 167 are wrapped around the player 175. The top clip 165 is removably attached to the cylindrical bar 155 to retain the player 175 within the adjustable mounting clip 145. The elastomeric band 167 provides tension to retain the player 175 in the adjustable mounting clip 145 as well as tension to maintain the top clip 165 on the cylindrical bar 155. In an alternative example, the top clip 165 may be eliminated and the elastomeric band 167 may be attached to the base clip 160 or cylindrical bar 155 directly.

Referring now to FIGS. 11-14, another example of an adjustable mounting clip 245 is shown. The adjustable mounting clip 245 includes an elastomeric loop 267 attached to the flexible collar 10. The elastomeric loop 267 includes a button spool 260 around which a free end 248 of the elastomeric loop 267 attaches. The button spool 260 includes teeth 265 spaced around a periphery of the button spool 260. In use, the free end 248 of the elastomeric loop 267 is stretched around the player 75 and hooked over the button spool 260 to retain the player 75 to the flexible collar 10. Preferably, the elastomeric loop 267 is constructed of a material that provides sufficient pressure and friction to the player 75 to retain it without movement. The wires 105 may then be wound around the button spool 260 and retained by the teeth 265. In this example, the hook projections 35 on the flexible collar 10 are not necessary or might not be used.

It is to be understood that the foregoing description is intended to illustrate and not to limit the scope of the invention, which is defined by the scope of the appended claims. Other embodiments are within the scope of the following claims. For example, the adjustable mounting clip may be hook and loop fasteners, zip cord, or any other flexible material looped around the player and a base clip that can be maintained in a fixed position or size to positively retain the player. Further, the locking device for the adjustable mounting clip 45 may be a pin, a clamp, a screw, or any other mechanical device that prevents the base clip 60 and movable clip 65 from moving relative to one another.

Further, while the side members 18 of the flexible collar have been shown and described as downward projections 20, the side members 18 may be any shape, including straight or curved. Further still, while the collar has been described as a flexible collar 10, the collar may be any design that will enable the collar to be retained on the user's neck.

Also, while the flexible collar 10 was shown and described as a single, unitary device, the flexible neck collar 10 may be multiple pieces. For example, the side members 18 may be separate from the semi-circular back portion 15, and movably attached to the semi-circular back portion. The movable attachment may be hinges to enable the flexible collar 10 to be folded like eyeglasses. Further still, the side members 18 may be adjustably attached to the semi-circular back portion to enable adjustment to the size of the flexible collar 10 or the angle 22 of the side members 18 to adjust the pressure applied to the user's neck.

Also, while the personal audio device has been shown as an Apple® iPod® MP3 player, the personal audio device may be any brand of MP3 player, a digital music player, a radio, a cellular telephone, personal digital assistant (PDA), tape player, or any other type of audio device.

Further, while safety features, such as plastics with iridescent properties to alert people to the user's presence, have been described, other safety devices may be employed. For example, light emitting diodes (LEDs) may be mounted to the collar. These LEDs can be stead or blinking, as well as integrally mounted or removable.

What is claimed is:

1. A personal audio device accessory comprising: a collar including a semi-circular back portion, two side members extending from the semi-circular back portion and an opening defined by distal ends of the two side members; an adjustable mounting clip coupled to the semi-circular back portion to removably retain a personal audio device; the collar further comprising hook projections, a wire retaining recess and wire retaining clips to manage and maintain wires from the personal audio device retained in the adjustable mounting clip; and the semi-circular back portion further comprising a concave recess to maintain wires from the personal audio device retained in the adjustable mounting clip.

2. The personal audio device accessory of claim 1 further comprising hook projections extending from the collar to retain wires from the personal audio device.

3. The personal audio device accessory of claim 1 wherein the adjustable mounting clip comprises a base clip rotatably coupled to the semi-circular back portion and a movable clip movably coupled to the base clip.

4. The personal audio device accessory of claim 1 wherein the adjustable mounting clip comprises a base clip rotatably coupled to the semi-circular back portion and a top clip connected to the base clip by an elastomeric band, the top clip being removably connectable to the base clip.

5. The personal audio device accessory of claim 1 wherein the adjustable mounting clip comprises a base clip rotatably coupled to the semi-circular back portion and an elastomeric band attached to the base clip at a first end and removably connectable to the base clip at a second end.

6. The personal audio device accessory of claim 1 wherein the adjustable mounting clip comprises an elastomeric loop including a button spool coupled to the semi-circular back portion, wherein the elastomeric loop portion may be stretched around a personal audio device and hooked to itself by the button spool.

7. The personal audio device accessory of claim 6 wherein the button spool includes teeth to retain wires from the personal audio device.

8. The personal audio device accessory of claim 1 wherein the adjustable mounting clip comprises pointers to enable tactile navigation of the personal audio device.

9. The personal audio device accessory of claim 1 wherein the personal audio device is selected from the group consisting of a digital music player, an MP3 player, a radio, a cellular telephone, a personal digital assistant, and a tape player.

10. The personal audio device accessory of claim 1 wherein the two side members are generally parallel to each other and the distal ends of the two side members are less than parallel to each other to form an inwardly projecting angle.

11. The personal audio device accessory of claim 1 wherein the semi-circular back portion and the side members are separate pieces movably coupled together by hinges.

12. The personal audio device accessory of claim 1 wherein the semi-circular back portion and the side members are separate pieces movably coupled together by adjustable connections.

13. The personal audio device accessory of claim 1 wherein the collar further includes recesses that enable the side members to flex.

14. The personal audio device accessory of claim 1 wherein the collar is made from a material selected from the group consisting of plastic, rubber, polycarbonate, and metal.

15. The personal audio device accessory of claim 14 wherein at least portions of the collar are overmolded with a thermoplastic elastomer.

16. The personal audio device accessory of claim 1 further comprising safety features.

17. The personal audio device accessory of claim 16 wherein the safety features are selected from the group consisting of iridescent plastic, reflective tape, a reflector, and light emitting diodes.

18. A personal audio device accessory comprising:
   a collar comprising:
      a semi-circular back portion having an inner surface and an outer surface, and a concave recess on the outer surface;
      two side members extending from the semi-circular back portion, each having an inner surface, an outer surface and a distal end, the inner surface of the semi-circular back portion and inner surface of the side members forming a continuous inner surface of the collar, and the outer surface of the semi-circular back portion and the outer surface of the side members forming a continuous outer surface of the collar;
      an opening defined by the distal ends of the two side members;
      two hook projections extending from the outer surface of the collar, the concave recess and two hook projections enabling the retention of wires from a personal audio device; and
   an adjustable mounting clip to removably retain the personal audio device comprising:
      a base clip rotatably coupled to the semi-circular back portion;
      a movable clip movably coupled to the base clip to move into and out of engagement with the personal audio device; and
      a locking mechanism to prevent unwanted movement of the movable clip.

19. The personal audio device accessory of claim 18 further comprising a thermoplastic elastomer disposed on at least a portion of the inner surface of the collar.

20. The personal audio device accessory of claim 18 wherein the adjustable mounting clip further comprises pointers to enable tactile navigation of the personal audio device.

21. The personal audio device accessory of claim 18 further comprising safety features.

22. The personal audio device accessory of claim 21 wherein the safety features are selected from the group consisting of iridescent plastic, reflective tape, a reflector, and light emitting diodes.

* * * * *